United States Patent
O'Sullivan et al.

(10) Patent No.: US 7,619,784 B1
(45) Date of Patent: Nov. 17, 2009

(54) PACING AND ERROR MONITORING OF MANUAL PAGE TURNING OPERATOR

(75) Inventors: Joseph K. O'Sullivan, San Francisco, CA (US); R. Alexander Proudfoot, Santa Clara, CA (US); Christopher R. Uhlik, Danville, CA (US)

(73) Assignee: Google Inc., Mountain View, CA (US)

( * ) Notice: Subject to any disclaimer, the term of this patent is extended or adjusted under 35 U.S.C. 154(b) by 944 days.

(21) Appl. No.: 10/611,681

(22) Filed: Jun. 30, 2003

(51) Int. Cl.
*H04N 1/04* (2006.01)
*G06K 9/00* (2006.01)
*G06K 9/62* (2006.01)

(52) U.S. Cl. ............... 358/474; 358/403; 382/181; 382/216

(58) Field of Classification Search ........ 358/474, 358/403; 382/216, 217, 181; 399/82
See application file for complete search history.

(56) References Cited

U.S. PATENT DOCUMENTS

| | | | |
|---|---|---|---|
| 2,406,152 A | 8/1946 | Levine | |
| 4,356,390 A | 10/1982 | Feilchenfeld | |
| 5,185,821 A * | 2/1993 | Yoda | ............... 382/306 |
| 5,636,006 A | 6/1997 | Wu | |
| 5,640,252 A | 6/1997 | Turner et al. | |
| 5,777,660 A | 7/1998 | Ard | |
| 5,835,241 A | 11/1998 | Saund | |
| 5,886,342 A | 3/1999 | Matsui | |
| 6,124,950 A | 9/2000 | Honda | |
| 6,491,278 B1 | 12/2002 | Thomsen | |
| 6,493,469 B1 | 12/2002 | Taylor | |
| 6,762,862 B2 | 7/2004 | Lam et al. | |
| 7,113,619 B1 | 9/2006 | Matama | |
| 7,224,472 B2 | 5/2007 | Bauch et al. | |
| 2003/0086721 A1* | 5/2003 | Guillemin et al. | ............. 399/82 |
| 2004/0047009 A1 | 3/2004 | Taylor et al. | |

OTHER PUBLICATIONS

Transaction History from PAIR printed Apr. 7, 2009, for U.S. Appl. No. 10/611,408.
Transaction History from PAIR printed Apr. 7, 2009, for U.S. Appl. No. 10/611,666.
Transaction History from PAIR printed Apr. 7, 2009, for U.S. Appl. No. 10/713,662.

* cited by examiner

*Primary Examiner*—Houshang Safaipour
(74) *Attorney, Agent, or Firm*—Fish & Richardson P.C.

(57) ABSTRACT

Systems and methods for pacing and error monitoring of a manual page turning operator of a system for capturing images of a bound document are disclosed. The system includes a speaker for playing music having a tempo and a controller for controlling the tempo based on an imaging rate and/or an error rate. The operator is influenced by the music tempo to capture images at a given rate. Alternative or in addition to audio, error detection may be implemented using OCR to determine page numbers to track page sequence and/or a sensor to detect errors such as object intrusion in the image frame and insufficient light. The operator may be alerted of an error with audio signals and signaled to turn back a certain number of pages to be recaptured. When music is played, the tempo can be adjusted in response to the error rate to reduce operator errors and increase overall throughput of the image capturing system. The tempo may be limited to a maximum tempo based on the maximum image capture rate.

38 Claims, 3 Drawing Sheets

PACING AND ERROR MONITORING OF MANUAL PAGE TURNING OPERATOR

CROSS REFERENCE TO RELATED APPLICATIONS

This application is related to co-pending U.S. patent application Ser. No. 10/611,408, entitled "Moveable Document Cradle for Facilitating Imaging of Bound Documents," filed Jun. 30, 2003, U.S. patent application Ser. No. 10/611,666, entitled "Acquiring and Using Three-Dimensional Information in a Document Scanning System," filed Jun. 30, 2003, and U.S. patent application Ser. No. 10/713,662, entitled "Imaging Opposing Bound Pages at High Speed Using Multiple Cameras," filed Nov. 13, 2003, which are incorporated herein by reference in their entireties.

BACKGROUND OF THE INVENTION

1. Field of the Invention

The present invention relates generally to scanning bound documents. More specifically, systems and methods for pacing and error monitoring of a manual page turning operator of a system for capturing images of a bound document are disclosed.

2. Description of Related Art

Scanning books, magazines, and other printed material into digital form has become more common with the advent of improved imaging, storage and distribution techniques. Although unbound printed material can generally be scanned with relative ease using automatic page-feeding mechanisms such as those commonly found on digital copiers and scanners, bound documents present additional challenges. Bound documents include not only books, but also periodicals, manuscripts, pamphlets, brochures, newspapers, manuals, and any other document having a bound edge. Many institutions, such as the Library of Congress, universities, bookstores, and private enterprises have vast collections of bound documents. By converting these documents into electronic form, such institutions can reduce the cost of storage, facilitate remote access, enable simultaneous access by multiple users, facilitate search and retrieval of information, and/or protect information in rare or out-of-print works from loss or destruction.

Once the content of a bound document is scanned, the recorded image can be manipulated or otherwise processed. Digitally recorded bound documents can be reformatted, supplemented with additional information, compressed, and/or processed with OCR (optical character recognition) software, and indexed to facilitate electronic search. Thus, scanning and recording of bound documents facilitates the creation of digital libraries that can be remotely and simultaneously accessed and searched by multiple users.

Various mechanisms have been developed to enable the scanning of bound documents. For example, a traditional flat-bed platen scanner scans bound documents in a face-down position. However, for best results, a flat-bed scanner typically requires the application of force to the spine or binding region of the bound documents to insure that they come within the scanner's depth of focus. Such force can damage the spine region of the document. In addition, using the flat-bed platen can be tedious and time-consuming, as the bound documents typically must be lifted and repositioned after each page is scanned. Further, image quality is often poor due to loss of focus, uneven illumination, and distortion caused by page curvature in the vicinity of the binding.

An alternative to the traditional flat-bed platen scanner is a platen-less scanner that captures image data from a bound document in a face-up position. Such scanners typically do not require application of additional stress to the binding region of a bound document, since the document is scanned in its natural, face-up position. Some such scanners make use of automatic page turning apparatuses. In addition, optics and software have been developed for compensating for the image-distortion resulting from the inherently curved surfaces typical of open, edge-bound books that are not subjected to potentially damaging flattening pressure. For example, the curvature of a document's pages may be detected using a curvature detector, with a linear light source for defining a brightness distribution. The detected curves of the page can then be used to approximately rectify image signals received from the document scanner.

Despite the development of automatic page turning apparatuses, an operator is still often employed to manually turn the pages of the bound document being imaged as there are limitations associated with an automatic page turner. Thus, it would be desirable to provide a system and method to improve the performance of a manual page turning operator for improved productivity.

SUMMARY OF THE INVENTION

Systems and methods for pacing and error monitoring of a manual page turning operator of a system for capturing images of a bound document are disclosed. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

A system for scanning images in a bound document generally includes a controller and may implement audio and/or error monitoring to facilitate the scanning of images. For example, music may be played at a tempo to help control the speed at which the operator manually turns the pages. The tempo may be adjusted based on the detected error rate and/or the image capture rate. The tempo may also be limited to a maximum tempo based on the maximum image capture rate. Alternative or in addition to the audio, error detection may be implemented using optical character recognition (OCR) to determine the printed page numbers in order to track page number sequence and/or using a sensor to detect other errors such as object intrusion into the image frame and insufficient light. The operator may be alerted of an error with audio signals and may also be signaled to turn back a certain number of pages to be recaptured. When music is played, the tempo can be adjusted in response to the detected operator error rate to reduce operator errors and thus increase the overall throughput of the image capturing system.

In one embodiment, the system for imaging a bound document generally includes a speaker for playing music having a tempo and a controller for controlling the tempo based on an imaging rate and/or a detected error rate. In another embodiment, the system generally includes an OCR engine for performing OCR processing and a controller which uses the OCR output to determine page numbering of the imaged pages. The region on which OCR processing is performed is preferably substantially less than the entire imaged page and may be determined based on the location of a pointer such as a finger of the operator, an image target, or a light or laser pointer. The controller may throw an exception if the controller fails to detect page numbers for a certain number of consecutive pages or if the controller detects non-sequential page numbers.

In another embodiment, the method for imaging a bound document generally includes playing music having a tempo through a speaker and controlling the tempo based on an image capture rate and/or an error rate. In yet another embodiment, the method generally includes performing OCR processing only on data corresponding to a border region of each imaged page and determining page numbers on the pages being imaged based on the OCR output.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Systems and methods for pacing and error monitoring of a manual page turning operator of a system for capturing images of a bound document are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Figure 1:
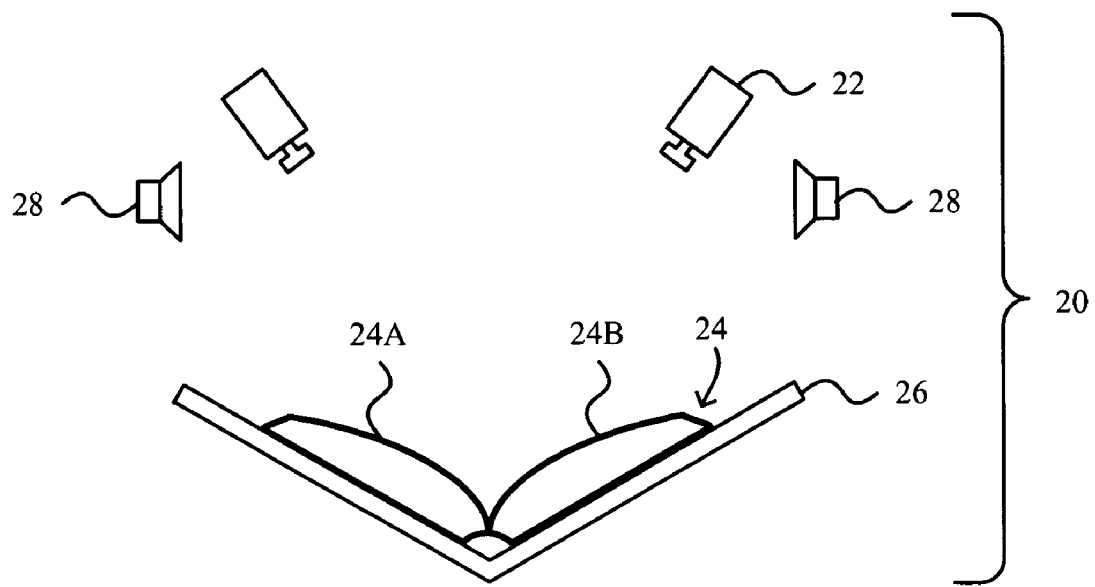
FIG. 1 is a simplified schematic diagram of an exemplary image capturing system.
Figure 2:
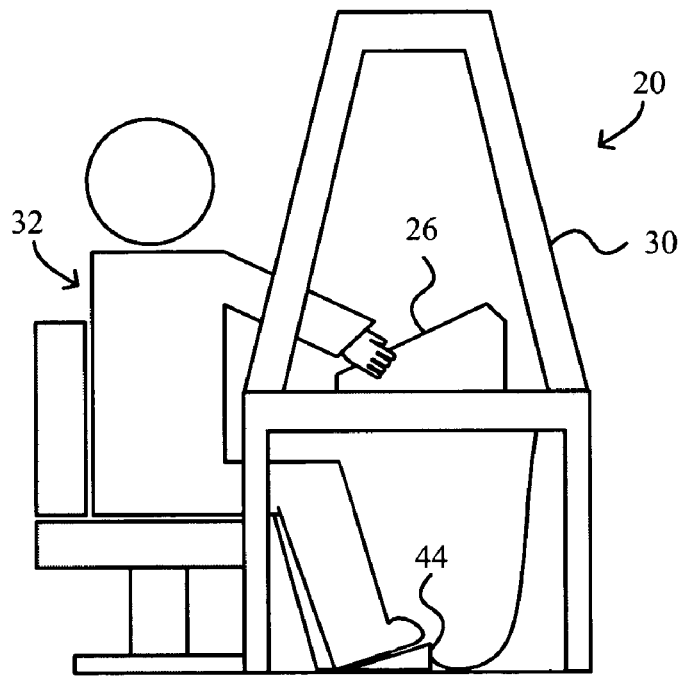
FIG. 2 is a schematic diagram illustrating an operator at the image capturing system of FIG. 1.

FIG. 1 is a schematic diagram of one exemplary embodiment of an image capturing system 20 and FIG. 2 is a schematic diagram illustrating an operator 32 at the image capturing system 20. The image capturing system 20 generally includes cameras 22, such as high resolution cameras, positioned to image or photograph the facing pages 24A, 24B of an open bound document, such as a book 24 resting in a cradle 26. It is to be understood that although a book is used herein in describing the imaging system and process, the system and process may be utilized to and/or adapted to image any other suitable types of bound documents such as periodicals, manuscripts, pamphlets, brochures, newspapers, manuals and/or any other types of documents having a bound edge, typically with a hard or soft cover. In addition, although the cameras 22 are shown as an exemplary image capturing mechanism for the image capturing system 20, any other image capturing mechanism such as a camera in combination with moving mirrors may be employed.

The system 20 may include a housing 30 or other structure to house or otherwise support the cameras 22, lighting mechanism, and/or other components of the image capturing system 20. The operator 32 may use a foot petal 44, for example, to cause the cameras 22 to capture the images. In particular, the operator 32 may depress the foot petal 44 after each page turn and after the operator is ready for the images to be captured.

The image capturing system 20 further includes one or more speakers 28 that may also be supported by the housing 30 for playing music and/or other sounds to assist the manual page turning operator 32. In particular, music can be played to facilitate the operator 32 in turning pages at a consistently high rate, to reduce boredom, delay fatigue, and/or inattentiveness, thereby maintaining alertness and consistency in the page turning rate for improved productivity. The tempo of the music may be used to help control the speed at which the operator 32 manually turns the pages. In one preferred embodiment, music is played at a tempo of, for example, 120 bpm (beats per minute) such that the operator turns one page turn every 4 beats or at a rate of 30 page turns per minute. As the cameras have an inherent maximum image capture rate, the tempo of the music may be used to help the operator 32 achieve a manual page turning rate up to but no greater than the maximum image capture rate of the cameras. Limiting the manual page turning to correspond to the maximum image capture rate also reduces camera errors due to overly fast image acquisition.

Although external speakers 28 are shown and described herein as the delivery mechanism for sound, it is to be understood that the speakers 28 may be embodied in a personal headset. One advantage of using personal headsets is that multiple operators, each listening to pacing music, may be working in a same room without interference from sound delivered to other operators.

Figure 3:
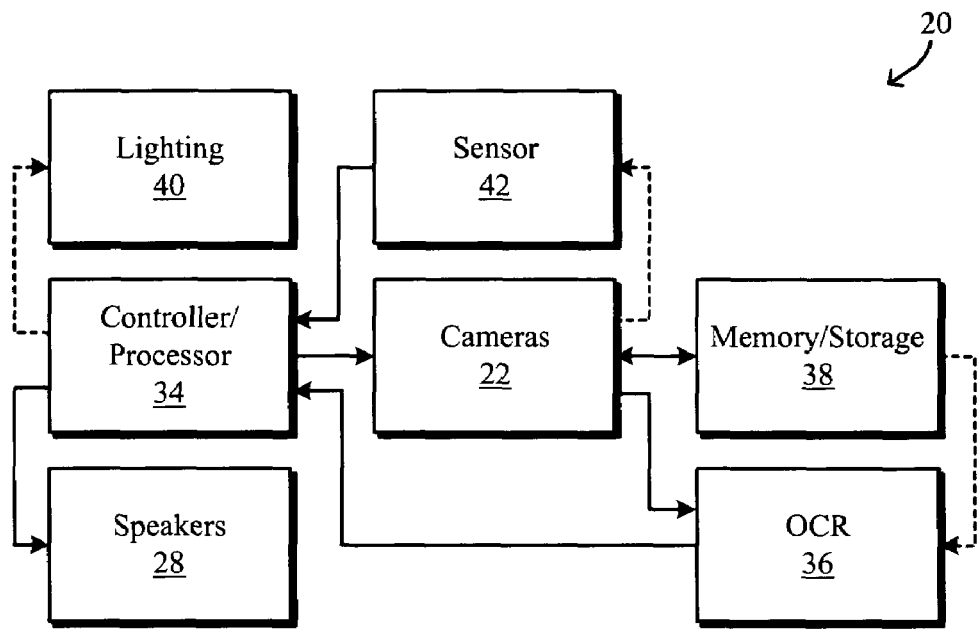
FIG. 3 is a block diagram illustrating additional elements associated with error detection of the image capturing system of FIG. 1.

In addition or as an alternative to the music, the speakers, in conjunction with an error detection system, may be utilized to provide an audio feedback mechanism to signal errors and/or other faults or exceptions to the operator. In particular, the block diagram of FIG. 3 illustrates additional components of the image capturing system 20 associated with error detection. As shown, the image capturing system 20 includes a controller or processor 34 that communicates with and/or controls an optical character recognition (OCR) engine 36, the cameras 22, the speakers 28, and/or lights 40 for lighting the facing pages of the book. The controller/processor 34 may include a sound card to interface with the speakers 28. The OCR 36 may perform optical character recognition on image data received either directly from the cameras 22 as is preferred or from a memory or storage 38 for the cameras (as shown in dashed). The OCR 36 in turn transmits the character data to the controller/processor 34 for further processing.

Figure 4:
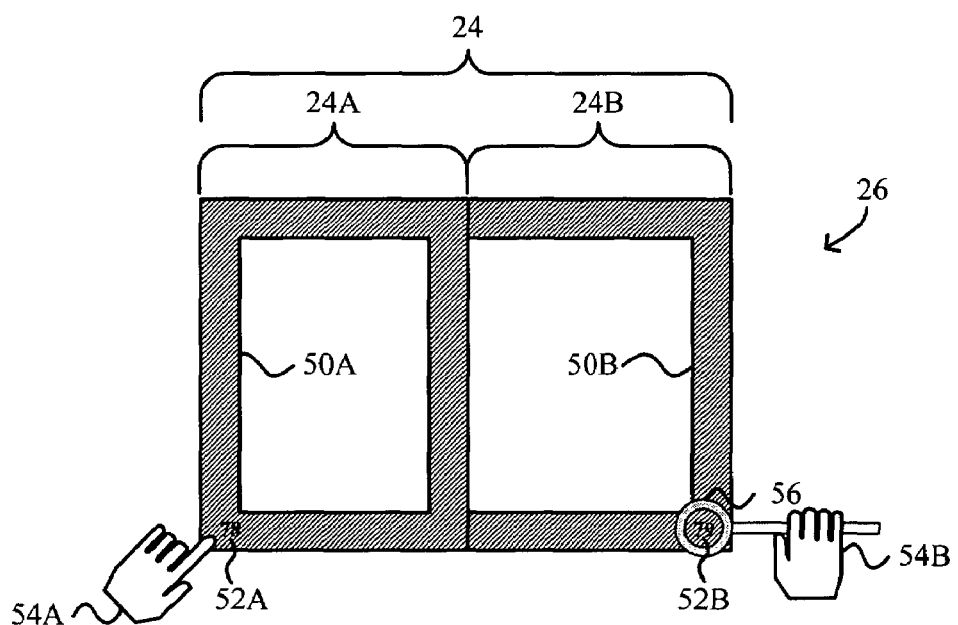
FIG. 4 is a schematic diagram of illustrative pointers for determining page number location of the imaged pages and illustrative border regions of the imaged pages on which OCR is performed.

The controller/processor 34 preferably uses the data received from the OCR 36 to attempt to determine the page number (if any) printed on each facing page imaged. To reduce computational requirements on the controller/processor 34 and thus reduce processing time, the controller/processor 34 preferably limits the processing for purposes of page number determination to only certain areas of each facing page where the page number is likely to be printed. Minimizing processing time may help increase the overall throughput of the image capturing system 20. For example, as shown in the schematic of FIG. 4, the OCR 36 and/or the controller/processor 34 may limit the processing to a border region around a portion or around the entire perimeter of each facing page. Both examples are shown in FIG. 4. Specifically, the OCR 36 and/or the controller/processor 34 may process the data for the border region around the entire perimeter of the facing page, as shown for the border region 50A of the left facing page 24A. Alternatively, the OCR 36 and/or the controller/processor 34 may process the OCR data for the border region around only a portion of the perimeter, as shown for border region 50B of the right facing page 24B. The difference between the border regions 50A and 50B is that the border region 50B does not include a region along the binding (middle) of a book, i.e., between the two facing pages 24A, 24B, since page numbering is rarely located near the binding of the book 24.

The width of the border regions to be processed for determining the printed page numbers may be determined in any suitable manner. For example, the width of the border region may be predetermined, e.g., set to 1.5" from the edges of the image frame or from the edges of each facing page. As another example, the width of the border region may be determined based on the dimensions of each facing page, e.g., as a percentage or other function of the width and/or height of each facing page.

As yet another example, the width of the border region may be determined using an initially more computationally intensive and/or otherwise time consuming method for the first few pages of each book being scanned until an appropriate width is determined and optimized. Although such a method may cause the controller/processor 34 to be a bottleneck in the imaging process, the bottleneck would only occur in the beginning of the imaging process for each book. In addition, the initial delay may be nonetheless beneficial in that the operator would be allowed more time to become accustomed to the characteristics specific to the particular book being scanned, e.g., thickness of the book, size of each page, resistance to page turning, page thickness and/or other characteristics. Furthermore, the optimized width of the border region would enable faster page numbering detection and faster error detection processing during the imaging of the remainder of the book.

One example of an initially more computationally intensive and/or otherwise time consuming method is to perform OCR on the entire page of each of the first few pages of the book and process all the data from the OCR until a sufficient number of data points as to the areas of the page numbers are ascertained. Once the locations of the page numbers are ascertained, OCR needs to be performed only for the regions around those locations containing the page number. Thereafter, only a minimal amount of processing would be necessary for the OCR and the controller/processor to determine the page number on the each page.

Another example of an initially more computationally intensive and/or otherwise time consuming method is to have the operator point to the page numbers on the first few pages of the book. As shown in FIG. 4, one finger of the operator's left hand 54A is pointing to the page number 52A on the left facing page 24A. As shown for the left hand 54A, the operator may wear a colored or other glove to facilitate the controller/processor in identifying the appropriate page number region. Although not shown, a finger of the operator's right hand 54B may also point to the page number 52B on the right facing page 24B, either at the same time or shortly after pointing to the page number 52A on the left facing page 24A. The controller/processor may then determine the locations to which the operator is pointing and limit the page number processing region to a relatively small portion of each page (including a certain amount as a safety factor).

As is evident, any other suitable method may be employed for determining the width of the border regions to be processed. It is to be understood that in the two examples described above, the process need not be limited to nor performed on the very first page(s) of the book as page numbering may not begin until, for example, after the title page. Furthermore, in the case where the operator points to the page number, any other method of facilitating the controller/processor in identifying the appropriate page number region may be employed. For example, instead of wearing a glove, the operator may wear a sheath over the tip of the pointing finger. Alternatively, instead of using the operator's finger itself as the pointer, the operator may hold a special image target such as an annular ring 56 over or adjacent to the page number and/or shine a laser pointer or other light pointer (not shown), etc. on or near the page number to facilitate the controller/processor in identifying the appropriate page number region. In addition, a sensor 42 (shown in FIG. 3) configured to sense the position to which the operator is pointing may be provided.

The controller/processor is preferably configured to properly detect various configurations and/or formats of page numbers. For example, the page number locations may be approximately the same on every page or may be at mirrored locations on opposing facing pages (as illustrated in FIG. 4). As another example, the page numbering format may change from one section of the book to another, such as the preface, table of contents, main content, and index sections. Further, the book may contain one or more page numbering formats such as Arabic numbers, lower case roman numerals, capitalized roman numerals, chapter-section format (e.g., 1.A.a, 2.C-i, etc.) for different sections of the book. In addition, page numbers may be omitted on certain pages, such as pages with images and/or tables that occupy the entire page.

As noted above, an audio feedback mechanism using the speakers is preferably provided to signal errors (including faults and exceptions) to the operator. The audio feedback signal may be any suitable sound that is distinguishable from the music that may be played to help maintain the operator's page turning rate, referred to herein as the tempo music. The audio feedback signal may be played through or in parallel with the tempo music. For example, a single or multiple beeps or chimes or any combination of signals may be played to signal to the operator that an error has occurred. Signals having different audio characteristics may represent different errors. Visual indicators of errors (such as an LCD display and/or LEDs) may also be provided.

The controller/processor and the OCR may form one example of an error detection system by tracking the page number sequence of the pages imaged to detect page number sequence errors. The error detection system may detect when the operator accidentally turns multiple pages at a time when the page numbers are out of sequence (e.g., pages skipped). The error detection system may also throw an exception when it fails to detect page numbers for a maximum or threshold number of pages, e.g., 4 pages. A threshold greater than 1 is preferred as there often are certain pages in a book that omit page numbering, such as pages with images and/or tables that occupy the entire page. In other words, the system would not throw an exception if the system fails to detect a page number for up to the threshold number of pages and then detects a page number on the next page that is equal to what the system is expecting. Alternatively, the system would throw an exception if the system fails to detect a page number for more than the threshold number of pages or if the system detects up to the threshold number of pages without a page number and then detects a page number on the next page that is not equal to what the system is expecting.

The controller/processor and the sensor may form another example of an error detection system by detecting any intrusions into the image, such as the operator's hand or arm. In addition to notifying the operator to remove the intrusion by generating an appropriate audio feedback signal, the controller/processor may also determine whether the captured images containing the intrusion should be recaptured. For example, the controller/processor may determine the margins of the pages and whether the intrusions were limited to the margins. The controller/processor and the sensor may also detect when the light level becomes insufficient so as to notify the operator and pause the scanning process in order to allow the operator to resolve the fault such as by replacing a dimmed or burned out light bulb and/or readjusting the positions of the lights. Preferably, if the light level is decreasing rather than dropped off suddenly, the system notifies the operator in time so as to not require the operator to turn back insufficiently lit pages to be imaged again.

Whenever an error that requires the operator to turn back a certain number of pages for purposes of imaging is detected, e.g., when skipped or otherwise non-sequential pages are detected, the audio feedback may generate a number of signals representative of the number of pages of the book that the operator should turn back. Alternatively, each time an error is detected, the operator is signaled to go back and recapture a fixed number of pages (e.g., 10 pages). The error can then be automatically fixed based on the sequence of page numbers. Any other suitable way of indicating to the operator the number of pages that the operators needs to turn back can also be implemented.

The error detection system preferably also tracks the error rate that is or may be attributable to the operator. The operator error rate may then be utilized for performance evaluations as well as to dynamically adjust both the tempo of the music being played using digital signal processing (DSP) and the imaging rate. For example, the music tempo may be increased gradually along with the imaging rate when the operator error rate is low, preferably only up to an upper limit that is at or less than the maximum rate at which the system may capture and process the images. The music tempo may be decreased along with the imaging rate when the operator error rate is high or is increasing over time. Decreasing the imaging rate to allow the operator more time between page turnings facilitates in decreasing the operator error rate. Adjusting the music tempo in response to the detected operator error rate helps to reduce operator errors, optimize and thus maximize the imaging rate, and thus increase the overall throughput of the image capturing system.

Figure 5:
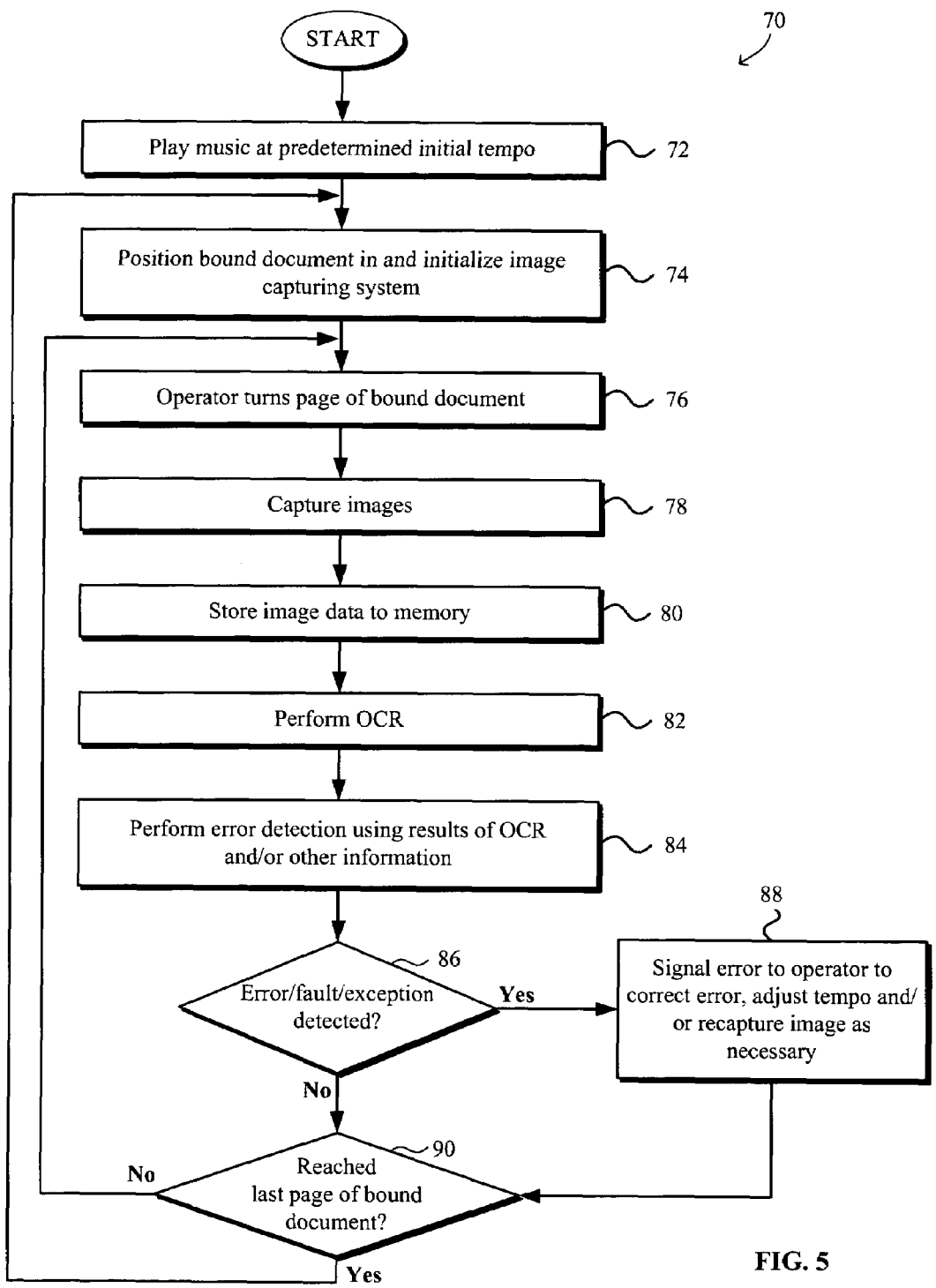
FIG. 5 is a flowchart illustrating a process using audio and error monitoring to facilitate the image capturing of pages in a bound document

FIG. 5 is a flowchart illustrating an exemplary process 70 for utilizing audio to facilitate the scanning of images in a bound document. At step 72, tempo music is played at a predetermined initial tempo. The predetermined initial tempo may be a standard one for all operators, e.g., 120 bpm, or may be selectively and/or periodically set on operator-by-operator basis, based on, for example, the relative experience levels of the operators and prior performance rates. At step 74, a bound document, such as a book, is positioned in the image capturing system, either automatically or manually by the operator into a cradle. Also at step 74, initialization of the image capturing system may be performed. For example, the operator may point to the locations of page numbers to initialize the image capturing system. It is noted that the system may be configured such that the user may choose to point to page numbers from any suitable location within the book rather than from the first pages of the book where page numbering may be absent. Alternatively, the determining of the general regions where the page numbers are located may be performed automatically by the image capturing system without operator intervention.

Next, at step 76, the operator turns a page of the book and at step 78, the camera or cameras capture images of the facing pages of the opening book. At step 80, data from the captured images is stored into memory. Optical character recognition (OCR) is performed on at least a portion of image data at step 82. Preferably, the OCR is only performed on a portion of each page, such as the region around the perimeter of each page, as discussed above. At step 84, results of the OCR may be used to detect the page numbering in order to track page number sequence and perform error detection. The locations of the detected page numbers may be used to fine tune subsequent OCR steps 82 by limiting the portion of image data on which OCR is performed. The error detection may also include using data from a sensor to detect intrusions into the image frame, to detect insufficient lighting cast on the pages of the bound volume, etc.

If the system determines that there is no error at decision block 86, the process proceeds to step 90. Alternatively, if the system determines that there is an error at decision block 86, the process proceeds to step 88 in which the system (i) signals (e.g., an audio signal) the error to the operator so that the operator may correct the error as necessary, (ii) adjusts the tempo of the music being played and/or (iii) signals to the operator the number of pages that needs to be recaptured so that the operator may turn back the appropriate number of pages. In one preferred embodiment, each time an error is detected, the operator is signaled to go back and recapture a fixed number of pages (e.g., 10 pages) and the error can then be automatically fixed using the sequence of page numbers. The process then proceeds to step 90.

At step 90, the system determines whether the last page of the book has been reached. If not, the process returns to step 76 in which the operator turns to the next page of the book. If the last page of the book has been reached, then the process returns to step 74 in which the operator positions the next book in the image capturing system and the image capturing system may be initialized for this next book.

It is noted that the particular order of the steps shown and described herein is illustrative of merely one suitable embodiment and that any other suitable combination and/or order of these steps may be implemented. For example, certain steps may be performed simultaneously or otherwise in an overlapping manner.

As is evident, audio may be used in a variety of ways to facilitate the scanning of images in a bound document. For example, the controller may adjust the tempo of the music based on the image capture rate. In other words, the tempo of the music is used to help control the speed at which the operator manually turns the pages. Alternative or in addition to the audio, error detection may be implemented using OCR to determine page numbers to track page sequence and/or a sensor to detect other errors such as object intrusion in the image and insufficient light cast on the pages of the bound volume. The operator may be alerted of an error with audio signals and may be signaled to turn back a certain number of pages to be recaptured. When tempo music is played, the tempo can be adjusted in response to the detected operator error rate to help reduce operator errors and thus increase the overall throughput of the image capturing system.

While the preferred embodiments of the present invention are described and illustrated herein, it will be appreciated that they are merely illustrative and that modifications can be made to these embodiments without departing from the spirit and scope of the invention. Thus, the invention is intended to be defined only in terms of the following claims.

What is claimed is:

1. An imaging system for imaging a bound document having a plurality of pages, comprising:
   an optical character recognition (OCR) engine for receiving at least a portion of image data, the OCR engine configured to perform OCR processing on data corresponding to a portion of a border region of each imaged page; and
   a controller in communication with the OCR engine and configured to receive data from the OCR engine to determine page numbers on the pages being imaged based at least in part on the data received from the OCR engine, the controller being further configured to detect an error based on comparing the page numbers of consecutive pages, wherein the controller processes OCR data based on scanning entire pages of an initial number of pages to determine the portion of the border region, and processes OCR data based on scanning only the portion of the border region on a subsequent number of pages.

2. The imaging system of claim 1, wherein the controller is further configured to detect an error when the controller fails to detect page numbers on a predetermined number of consecutive pages of the document.

3. The imaging system of claim 1, wherein the controller is further configured to track the sequence of the page numbers of the images captured and to detect an error based on the sequence of the page numbers.

4. The imaging system of claim 1, wherein the border region is selected from the group consisting of a border region around an entire perimeter of the imaged page and a border region around a portion of the perimeter of the imaged page.

5. The imaging system of claim 1, further comprising a speaker in communication with the controller, wherein the controller is configured to generate an audio signal at the speaker when an error is detected.

6. The imaging system of claim 1, wherein the controller is configured to determine the page numbers based also on a location of a pointer positioned on a page of the bound document.

7. The imaging system of claim 6, wherein the pointer is selected from the group consisting of a finger of an operator, a sheath placed over finger of the operator, a portion of a glove worn by the operator, an image target, an annular ring, a light pointer, and a laser pointer.

8. The imaging system of claim 6, wherein the portion is substantially less than the entire imaged page, the portion being determined based on the location of the pointer.

9. The imaging system of claim 6, further comprising a sensor in communication with the controller and configured to detect the location of the pointer.

10. The imaging system of claim 9, wherein the sensor is further configured to detect at least one of an intrusion into an image area of the camera and insufficient light cast on the pages of the bound volume.

11. A method for imaging a bound document having multiple pages, the method comprising the steps of:
    performing optical character recognition (OCR) processing by an OCR engine on data corresponding to a portion of a border region of each imaged page, the image data being received from the camera;
    processing OCR data based on scanning entire pages of an initial number of pages to determine the portion of the border region;
    processing OCR data based on scanning only the portion of the border region on a subsequent number of pages;
    determining, by a controller, page numbers on the pages being imaged based at least in part on the data received from the OCR engine; and
    detecting an error based on comparing the page numbers of consecutive pages.

12. The method of claim 11, wherein the border region is selected from the group consisting of a border region around an entire perimeter of the imaged page and a border region around a portion of the perimeter of the imaged page.

13. The method of claim 11, further comprising the step of tracking, by the controller, the sequence of the page numbers of the images captured by the camera.

14. The method of claim 13, further comprising the steps of:
    detecting an error when the controller fails to detect page numbers on a predetermined consecutive pages of the document; and
    generating an audio signal at a speaker when an error is detected.

15. The method of claim 13, further comprising the steps of:
    detecting an error based on the sequence of the page numbers; and
    generating an audio signal through a speaker when an error is detected.

16. The method of claim 11, wherein the step of determining the page numbers is based also on a location of a pointer positioned on a page of the bound document.

17. The method of claim 16, wherein the pointer is selected from the group consisting of a finger of an operator, a sheath placed over finger of the operator, a portion of a glove worn by the operator, an image target, an annular ring, a light pointer, and a laser pointer.

18. The method of claim 16, wherein the portion is substantially less than the entire imaged page, the portion being determined based on the location of the pointer.

19. The method of claim 16, further comprising the step of detecting the location of the pointer with a sensor in communication with the controller.

20. The method of claim 19, further comprising the step of detecting, with the sensor, at least one of an intrusion into an image area of the camera and insufficient light cast on the pages of the bound volume.

21. An imaging system for imaging a bound document having a plurality of pages, comprising:
    an optical character recognition (OCR) engine for receiving at least a portion of image data, the OCR engine configured to perform OCR processing on data corresponding to a portion of a border region of each imaged page; and
    a controller in communication with the OCR engine and configured to receive data from the OCR engine to determine page numbers on the pages being imaged based at least in part on the data received from the OCR engine, the controller being further configured to detect an error based on the page numbers,
    wherein the controller processes OCR data based on scanning entire pages of an initial number of pages to determine the portion of the border region, and processes OCR data based on scanning only the portion of the border region on a subsequent number of pages, and is further configured to detect an error when the controller fails to detect page numbers on a predetermined number of consecutive pages of the document.

22. The imaging system of claim 21, wherein the controller is further configured to track the sequence of the page numbers of the images captured and to detect an error based on the sequence of the page numbers.

23. The imaging system of claim 21, wherein the border region is selected from the group consisting of a border region around an entire perimeter of the imaged page and a border region around a portion of the perimeter of the imaged page.

24. The imaging system of claim 21, further comprising a speaker in communication with the controller, wherein the controller is configured to generate an audio signal at the speaker when an error is detected.

25. The imaging system of claim 21, wherein the controller is configured to determine the page numbers based also on a location of a pointer positioned on a page of the bound document.

26. The imaging system of claim 25, wherein the pointer is selected from the group consisting of a finger of an operator, a sheath placed over finger of the operator, a portion of a glove worn by the operator, an image target, an annular ring, a light pointer, and a laser pointer.

27. The imaging system of claim 25, wherein the portion is substantially less than the entire imaged page, the portion being determined based on the location of the pointer.

28. The imaging system of claim 25, further comprising a sensor in communication with the controller and configured to detect the location of the pointer.

29. The imaging system of claim 28, wherein the sensor is further configured to detect at least one of an intrusion into an image area of the camera and insufficient light cast on the pages of the bound volume.

30. A method for imaging a bound document having multiple pages, comprising:
    performing optical character recognition (OCR) processing by an OCR engine on data corresponding to a portion of a border region of each imaged page, the image data being received from the camera;
    processing OCR data based on scanning entire pages of an initial number of pages to determine the portion of the border region;
    processing OCR data based on scanning only the portion of the border region on a subsequent number of pages;
    determining, by a controller, page numbers on the pages being imaged based at least in part on the data received from the OCR engine; and
    detecting an error based on the page numbers,
    wherein the border region is selected from the group consisting of a border region around an entire perimeter of the imaged page and a border region around a portion of the perimeter of the imaged page.

31. The method of claim 30, further comprising tracking, by the controller, the sequence of the page numbers of the images captured by the camera.

32. The method of claim 31, further comprising:
    detecting an error when the controller fails to detect page numbers on a predetermined consecutive pages of the document; and
    generating an audio signal at a speaker when an error is detected.

33. The method of claim 31, further comprising:
    detecting an error based on the sequence of the page numbers; and
    generating an audio signal through a speaker when an error is detected.

34. The method of claim 30, wherein determining the page numbers is based also on a location of a pointer positioned on a page of the bound document.

35. The method of claim 34, wherein the pointer is selected from the group consisting of a finger of an operator, a sheath placed over finger of the operator, a portion of a glove worn by the operator, an image target, an annular ring, a light pointer, and a laser pointer.

36. The method of claim 34, wherein the portion is substantially less than the entire imaged page, the portion being determined based on the location of the pointer.

37. The method of claim 34, further comprising detecting the location of the pointer with a sensor in communication with the controller.

38. The method of claim 37, further comprising detecting, with the sensor, at least one of an intrusion into an image area of the camera and insufficient light cast on the pages of the bound volume.

* * * * *

UNITED STATES PATENT AND TRADEMARK OFFICE
CERTIFICATE OF CORRECTION

| | | |
|---|---|---|
| PATENT NO. | : 7,619,784 B1 | Page 1 of 1 |
| APPLICATION NO. | : 10/611681 | |
| DATED | : November 17, 2009 | |
| INVENTOR(S) | : O'Sullivan et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1447 days.

Signed and Sealed this

Twenty-sixth Day of October, 2010

David J. Kappos
*Director of the United States Patent and Trademark Office*